W. S. BURGESS.
Sheep-Shearing Machine.
No. 206,661. Patented Aug. 6, 1878.
Fig. 1.
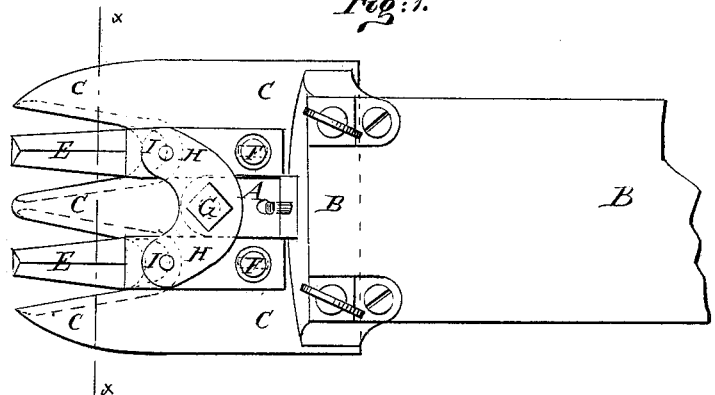
Fig. 2.
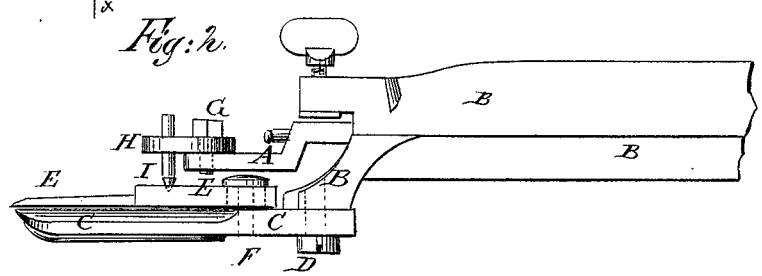
Fig. 3.
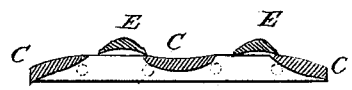
Fig. 4.
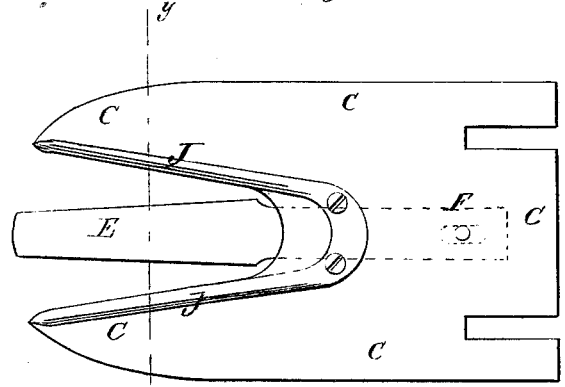
Fig. 5.
WITNESSES:
Chas. Niott
C. Sedgwick
INVENTOR:
W. S. Burgess
BY Munn & Co
ATTORNEYS.

UNITED STATES PATENT OFFICE.

WARREN S. BURGESS, OF NORRISTOWN, PENNSYLVANIA, ASSIGNOR TO JOHN H. DAGER AND GEORGE W. GRADY, OF SAME PLACE.

IMPROVEMENT IN SHEEP-SHEARING MACHINES.

Specification forming part of Letters Patent No. 206,661, dated August 6, 1878; application filed June 5, 1878.

*To all whom it may concern:*

Be it known that I, WARREN S. BURGESS, of Norristown, in the county of Montgomery and State of Pennsylvania, have invented a new and useful Improvement in Sheep-Shearing Machines, of which the following is a specification:

Figure 1 is a top view of the shearing device, shown as applied to the frame of a clipping-machine. Fig. 2 is a side view of the same. Fig. 3 is a cross-section of the same, taken through the line $x\ x$, Fig. 1. Fig. 4 is an under-side view of a modification of the shearing device. Fig. 5 is a cross-section of the same, taken through the line $y\ y$, Fig. 4.

The object of this invention is to furnish an improved attachment for the clipping-machine for which Letters Patent No. 155,855 were granted to W. S. Burgess and C. P. Pickings, to adapt it for use for shearing sheep, and which shall be simple in construction and reliable in operation.

The invention consists in the combination of the cutter-plate, provided with two or more stationary cutters, one or more vibrating cutters, and the pivot-screws, with each other, and with the vibrating lever and the frame or case of a clipping-machine, to adapt it for use for shearing sheep.

The invention consists in the construction and combination of parts, as hereinafter described and claimed.

A represents the vibrating lever, and B the case or frame that covers and protects it, and which also serves as a handle in using the machine. C is the cutter-plate, which has two U-shaped notches formed in its forward edge, forming three blades or stationary cutters. In the rear edge of the plate C are formed two notches or slots, as shown in Fig. 4, to receive the screws D, by which it is secured to the lower side of the forward end of the frame or case B.

E are the blades or movable cutters, which are pivoted at their rear ends to the rear part of the upper side of the plate C by the screws F, which pass through the said blades E and screw into the plate C. The blades E have short slots formed in them for the passage of the screws F, to give them the necessary play.

To the forward end of the vibrating lever A is secured, by a screw, G, the center of a curved or half-ring bar, H, through the ends of which pass screws I. The forward ends of the screws I are rounded off to enter recesses in the upper sides of the blades E, and vibrate the said blades.

The upper sides of the side cutters C are inclined, and the upper sides of the central cutters C and the lower sides of the knives E are concaved, so that the said cutters and knives may operate as the blades of shears, and may tend to keep themselves sharp.

If desired, the plate C may be made with only two cutters, and may have a single knife, E, pivoted to it, as shown in Figs. 4 and 5. In this case the pivot-screw F, that vibrates the said knife E, passes down through the end of the vibrating lever A, the curved bar H not being required.

To the lower side of each cutter C is attached a guard-bar, J, to prevent the machine from gathering the skin of the sheep into folds and cutting it.

If desired, the guard-bars J may be made in U form, passing around the U-notches of the plate C, as shown in Fig. 4.

Having thus described my invention, I claim as new and desire to secure by Letters Patent—

1. The combination of the cutter-plate C, provided with two or more stationary cutters, one or more vibrating cutters, E, and the screws F I, with each other, and with the vibrating lever A and the frame or case B of a clipping-machine, to adapt it for use for shearing sheep, substantially as herein shown and described.

2. The combination of the guard-bars J with the lower side of the edges of the stationary cutters C, substantially as herein shown and described.

WARREN S. BURGESS.

Witnesses:
HENRY R. BROWN,
J. R. HUNSICKER.